(12) United States Patent
Park et al.

(10) Patent No.: US 8,451,273 B2
(45) Date of Patent: May 28, 2013

(54) METHOD AND APPARATUS FOR OBTAINING MINIMUM COST VECTOR FOR MAKING SKYLINE OBJECT IN MULTI-DIMENSIONAL SPACE

(75) Inventors: Choon Seo Park, Daejeon (KR); Yong Ju Lee, Daejeon (KR); Song Woo Sok, Daejeon (KR); Jin Hwang Jeong, Seoul (KR); Joong Soo Lee, Daejeon (KR); Jung Hyun Cho, Seoul (KR); Ok Gee Min, Daejeon (KR); Chang Soo Kim, Daejeon (KR); Hag Young Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/898,847

(22) Filed: Oct. 6, 2010

(65) Prior Publication Data
US 2011/0084969 A1    Apr. 14, 2011

(30) Foreign Application Priority Data

Oct. 12, 2009  (KR) .................. 10-2009-0096711
Aug. 24, 2010  (KR) .................. 10-2010-0081723

(51) Int. Cl.
*G06T 11/20* (2006.01)

(52) U.S. Cl.
USPC ........... 345/440; 345/442; 345/443; 702/179; 707/999.102; 715/215

(58) Field of Classification Search
CPC ................................................ G06T 11/206
USPC ........... 345/440, 443; 702/179; 707/999.102
See application file for complete search history.

(56) References Cited

U.S. PATENT DOCUMENTS

| 7,234,126 | B2 * | 6/2007 | Catthoor et al. | 716/104 |
| 7,593,839 | B1 * | 9/2009 | Wu et al. | 703/9 |
| 2005/0165824 | A1 * | 7/2005 | Farnham et al. | 707/102 |
| 2007/0198439 | A1 | 8/2007 | Shriraghav et al. | |
| 2009/0254314 | A1 * | 10/2009 | Ivosev et al. | 702/189 |
| 2010/0153064 | A1 * | 6/2010 | Cormode et al. | 702/179 |

FOREIGN PATENT DOCUMENTS

| KR | 10-2009-0092479 A | 9/2009 |
| KR | 10-2009-0100852 A | 9/2009 |

OTHER PUBLICATIONS

Jang, Su Min; Park, Choon Seo; and Yoo, Jae Soo. Skyline Minimum Vector. Web Conference (APWEB), 2010 12th International Asia-Pacific, Apr. 6-8, 2010, pp. 358-360, IEEE, Busan, Republic of Korea.

Borzsonyi, Stephan; Kossman, David; and Stocker, Conrad. The Skyline Operator. In the Proceedings of the ICDE, 2001, Paper #235, pp. 1-20.

* cited by examiner

*Primary Examiner* — Xiao M. Wu
*Assistant Examiner* — Todd Buttram
(74) *Attorney, Agent, or Firm* — Kile Park Reed & Houtteman PLLC (57) ABSTRACT

Provided are a method and apparatus for obtaining a minimum cost vector for making a skyline object in a multi-dimensional space. The method includes calculating respective vector values having a query point and respective moving points to which the query point is moved as both end points in a multi-dimensional space having a plurality of coordinate axes, and selecting a vector value whose moving point is included in a skyline and has the minimum distance value from the query point as the minimum vector value from among the vector values.

9 Claims, 6 Drawing Sheets

| SKYLINE OBJECT POINT | $a_1$ | $a_2$ |
|---|---|---|
| $P_1$ | 1 | 9 |
| $P_2$ | 2 | 6 |
| $P_3$ | 3 | 4 |
| $P_4$ | 4 | 2 |
| $P_5$ | 7 | 1 |
| QUERY POINT(Q) | 6 | 7 |

FIG. 5

| MOVING POINT | $a_1$ | $a_2$ | MANHATTAN DISTANCE | MINIMUM SKYLINE VECTOR |
|---|---|---|---|---|
| $V_1$ | 1 | 7 | 5 | (-5, 0) |
| $V_2$ | 2 | 6 | 5 | (-4, -1) |
| $V_3$ | 2 | 5 | 6 | |
| $V_4$ | 3 | 4 | 6 | |
| $V_5$ | 3 | 3 | 7 | |
| $V_6$ | 4 | 2 | 7 | |
| $V_7$ | 6 | 1 | 6 | |
| QUERY POINT(Q) | 6 | 7 | | |

METHOD AND APPARATUS FOR OBTAINING MINIMUM COST VECTOR FOR MAKING SKYLINE OBJECT IN MULTI-DIMENSIONAL SPACE

CROSS-REFERENCE TO RELATED APPLICATION

This application claims priority to and the benefit of Korean Patent Application No. 10-2009-0096711, filed Oct. 12, 2009 and Korean Patent Application No. 10-2010-0081723, filed Aug. 24, 2010, the disclosure of which is incorporated herein by reference in its entirety.

BACKGROUND

1. Field of the Invention

The present invention relates to a method and apparatus for obtaining a minimum cost vector, and more particularly to a method and apparatus for making a skyline object in a multi-dimensional space.

2. Discussion of Related Art

In late search services, skyline query processing is attracting considerable attention. A skyline is a set of interesting objects which are not dominated by another object in terms of all attributes.

For example, a traveler wants to have an answer to a question such as "Which hotel is near the beach and has a low rate?" However, the closer to the beach a hotel is, the more expensive the hotel is likely to be. Thus, it is not easy to search for the best hotel.

The skyline of hotels consists of hotels in which the traveler may be interested, as mentioned above. In other words, the skyline of hotels is a set of hotels in which the traveler is more interested than other hotels in terms of distance to the beach or hotel price.

Consequently, a method of effectively processing a skyline query, such as "Which hotel is near the beach and has a low rate?", "What is the most effective method for products of our company to be more favored by users than favored products of rival companies?" is required.

SUMMARY OF THE INVENTION

The present invention is directed to providing a method for effectively including a query point in a skyline, that is, a query processing method useful for decision making in various application fields such as service of companies.

One aspect of the present invention provides a method of obtaining a minimum cost vector for making a skyline object in a multi-dimensional space including: calculating respective vector values having a query point and respective moving points to which the query point is moved as both end points in a multi-dimensional space having a plurality of coordinate axes; and selecting a vector value whose moving point is included in a skyline and has the minimum distance value from the query point as the minimum vector value from among the vector values.

Another aspect of the present invention provides an apparatus for obtaining a minimum cost vector for making a skyline object in a multi-dimensional space including: a vector value calculator for calculating respective vector values having a query point and respective moving points to which the query point is moved as both end points in a multi-dimensional space having a plurality of coordinate axes; and a minimum vector value processor for selecting a vector value whose moving point is included in a skyline and has the minimum distance value from the query point as the minimum vector value from among the vector values.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

In an exemplary embodiment of the present invention, a method of obtaining a minimum cost vector for making a skyline object in a two-dimensional space will be described to aid in understanding. However, exemplary embodiments of the present invention are not limited to a two-dimensional space but can be applied to a multi-dimensional space.

Figure 1:
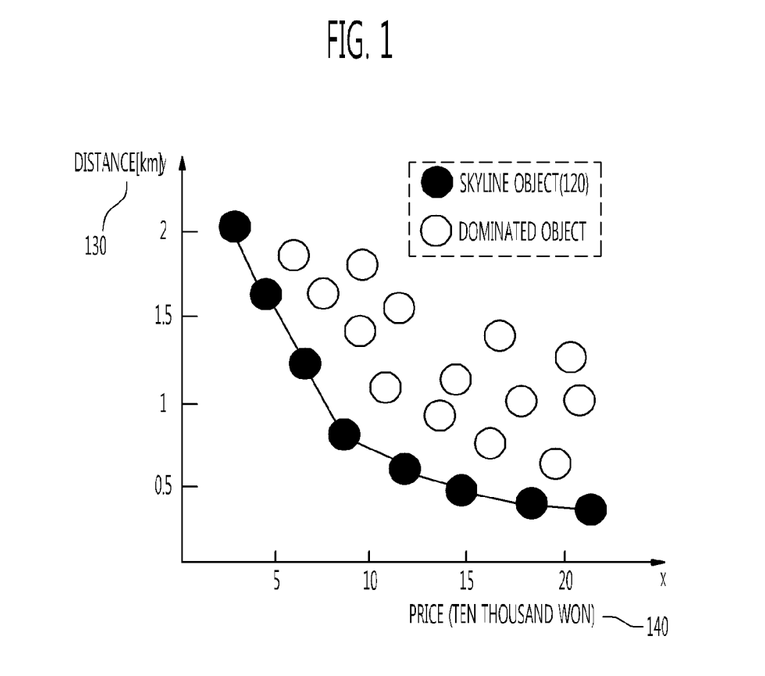
FIG. 1 is a graph illustrating a skyline according to an exemplary embodiment of the present invention.

FIG. 1 is a graph illustrating a skyline according to an exemplary embodiment of the present invention.

A skyline according to an exemplary embodiment of the present invention is a set of skyline objects 120 which are not dominated by another object, and a skyline query is an operation of searching for the skyline objects 120 which are not dominated by another object among objects having multiple attributes. Also, the skyline is expressed in a multi-dimensional space having a plurality of coordinate axes 130 and 140 indicating attributes, and each of the skyline objects 120 has the attributes corresponding to the coordinate axes 130 and 140.

When all attributes of a first object have the same or smaller values than those of a second object, or at least one attribute of the first object has the same or smaller value than that of the second object on the assumption that a small attribute value is better than a large one, it is said according to an exemplary embodiment of the present invention that the first object dominates the second object.

To be specific, the skyline denotes a line consisting of the skyline objects 120 having a better attribute than other objects.

For example, in response to a query of a traveler such as "Which hotel is near the beach and has a low rate?", it is not easy to search for the best hotel because the closer to the beach a hotel is, the more expensive the hotel is likely to be. According to an exemplary embodiment of the present invention, hotels which are not worse than other hotels in terms of both distance and price are retrieved and suggested to the traveler as hotels in which the traveler may be interested so that the traveler can make a final decision.

In this way, a skyline of hotels consists of the hotels in which the traveler may be interested. In other words, as shown in FIG. 1, a set of the hotels in which the traveler is more interested than other hotels in terms of distance to the beach or hotel price may be the skyline of hotels.

Figure 2:
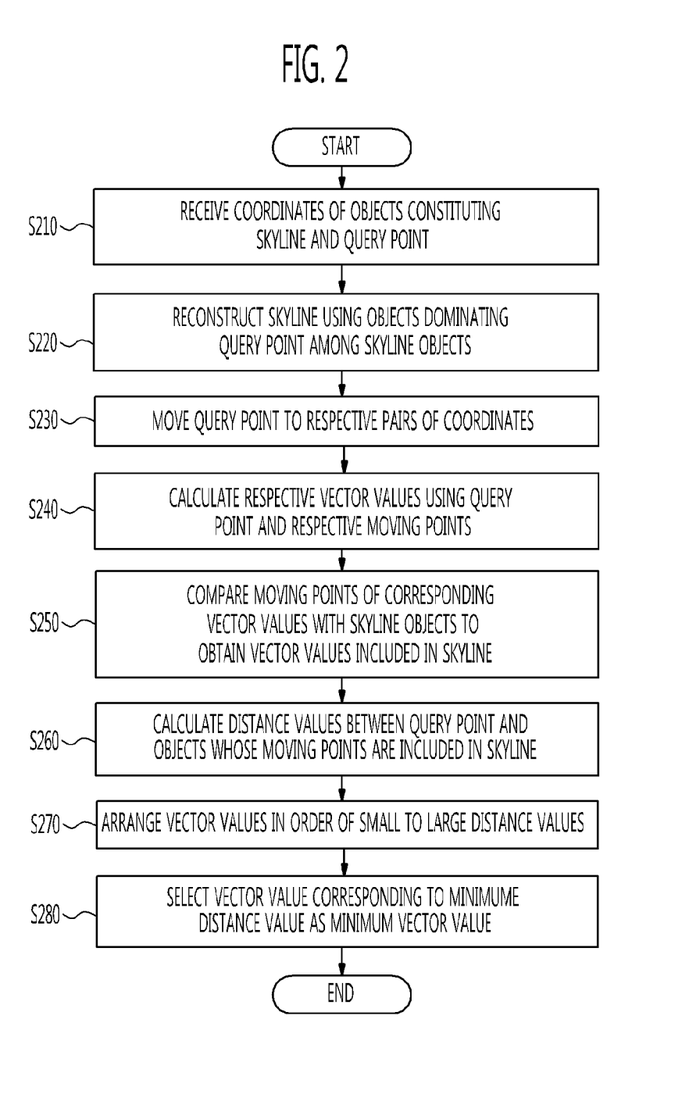
FIG. 2 is a flowchart illustrating a method of obtaining a minimum cost vector for making a skyline object in a two-dimensional space according to an exemplary embodiment of the present invention.
Figure 3:
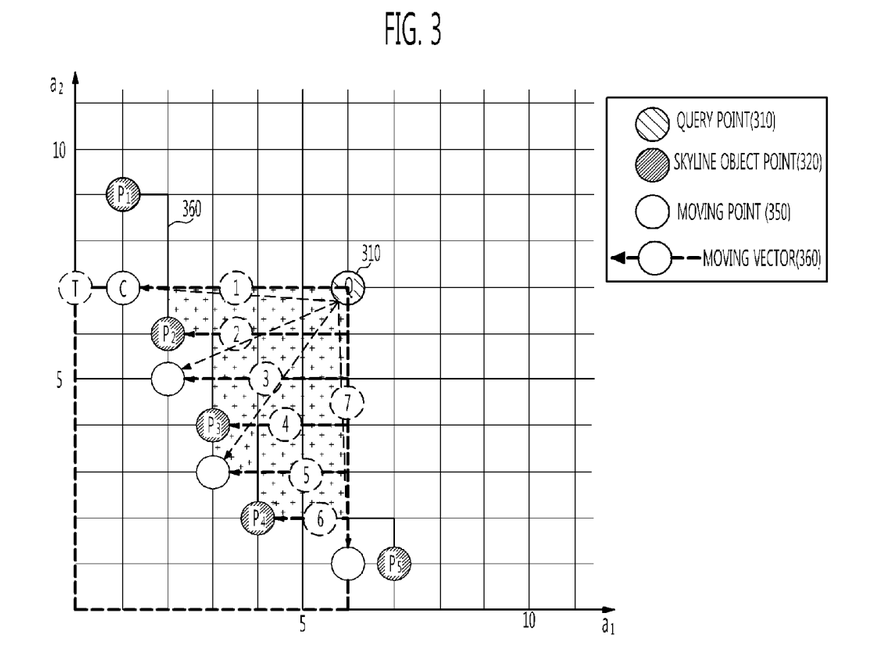
FIG. 3 is a diagram illustrating a method of obtaining a minimum cost vector for making a skyline object in a two-dimensional space according to an exemplary embodiment of the present invention.
Figure 4:
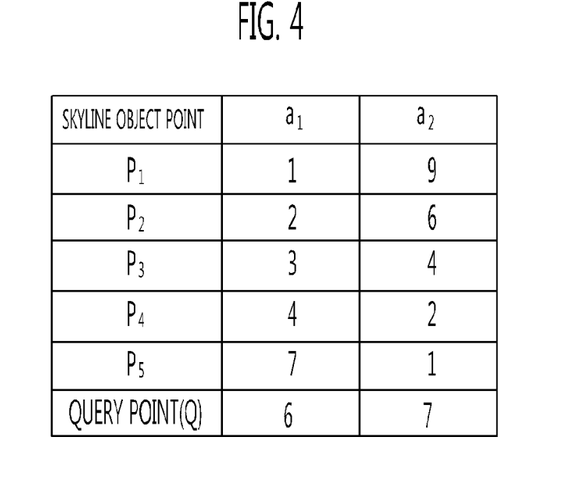
FIGS. 4 and 5 are tables illustrating a method of obtaining a minimum cost vector for making a skyline object in a two-dimensional space according to an exemplary embodiment of the present invention.
Figure 5:
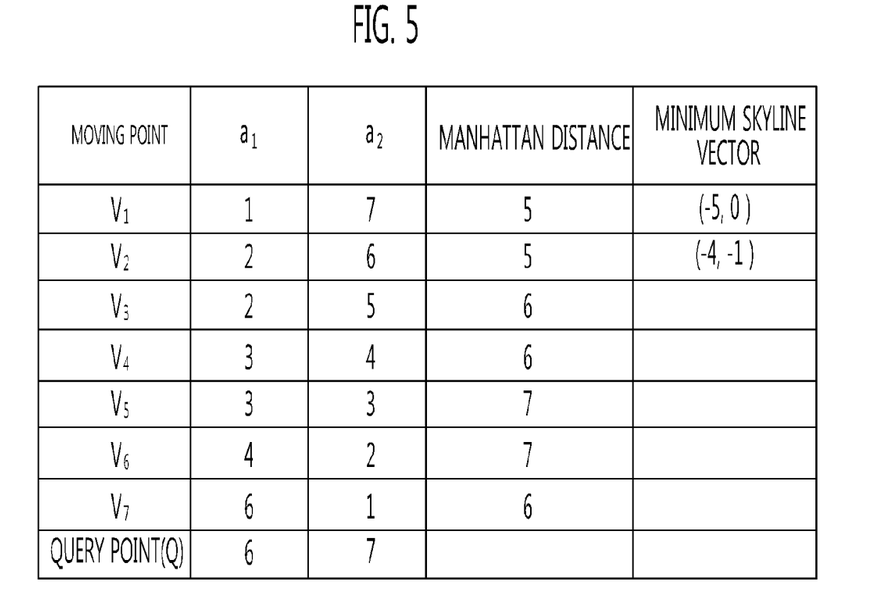
Figure 6:
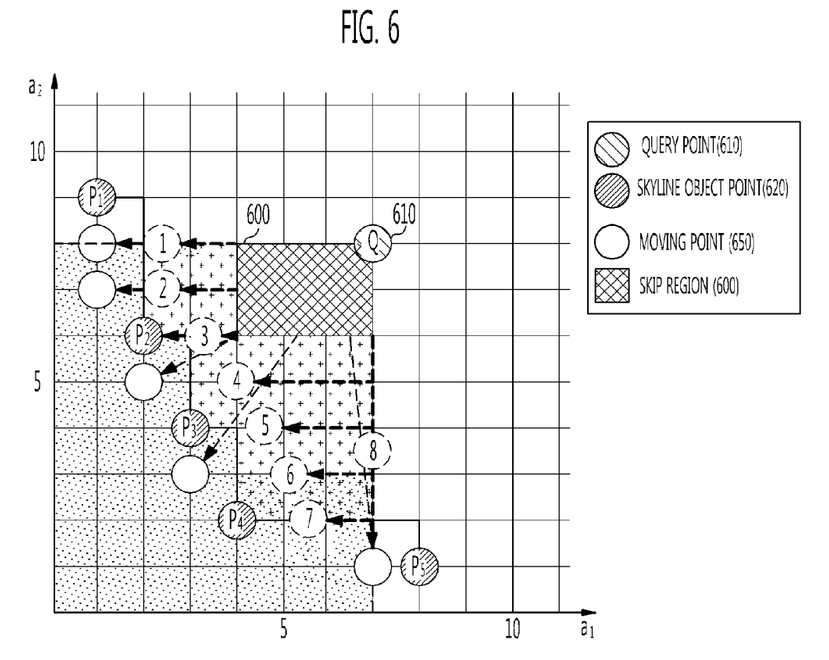
FIG. 6 is a diagram illustrating a method of obtaining a minimum cost vector for making a skyline object in a two-dimensional space according to another exemplary embodiment of the present invention.

FIG. 2 is a flowchart illustrating a method of obtaining a minimum cost vector for making a skyline object in a two-dimensional space according to an exemplary embodiment of the present invention, and FIG. 3 is a diagram illustrating a method of obtaining a minimum cost vector for making a skyline object in a two-dimensional space according to an exemplary embodiment of the present invention. FIGS. 4 and 5 are tables illustrating a method of obtaining a minimum cost vector for making a skyline object in a two-dimensional space according to an exemplary embodiment of the present invention, and FIG. 6 is a diagram illustrating a method of obtaining a minimum cost vector for making a skyline object in a two-dimensional space according to another exemplary embodiment of the present invention.

A method of obtaining a minimum cost vector for making a skyline object in a two-dimensional space according to exemplary embodiments of the present invention will be described with reference to FIGS. 2 to 6.

In the method of obtaining a minimum cost vector according to an exemplary embodiment of the present invention, coordinate pairs of objects constituting a skyline and a query point 310 are input in step 210.

In step 220, the skyline is reconstructed using objects dominating the query point 310 among the skyline objects whose coordinate pairs are input.

In step 230, the query point 310 is moved to the respective coordinate pairs. The query point 310 is moved in the direction of a moving vector 360 in which a coordinate value (attribute value) decreases.

At this time, the query point 310 is moved to a point included in the skyline in a direction in which a first coordinate value of the query point 310 decreases. When the query point 310 is moved to the point included in the skyline, a second coordinate value is reduced by one, and the query point 310 is moved again in the direction in which the first coordinate value decreases.

To be specific, the query point 310 is moved along first to seventh moving vectors shown in FIG. 3 in order of the first to seventh moving vectors. For example, a first moving point 350 included in the skyline is found while the query point 310 is moved in the direction of the first moving vector, and it is possible to know that a moving point C is included in the skyline. Also, after being moved in the direction of the first moving vector to find the moving point C, the query point 310 may be further moved to find a moving point T. However, the moving point T has a larger distance value than the moving point C, and thus it is unnecessary to move further. After being moved to the moving point C to check that the moving point C is included in the skyline, the query point 310 is moved in the direction of the next vector, that is, the second moving vector. In other words, when the first moving point 350 included in the skyline is found while the query point 310 is moved in the respective directions of the first to seventh moving vectors in sequence, the query point 310 is not moved further in the corresponding direction but moved in the direction of the next moving vector.

Subsequently, in step 240, respective vector values are calculated using the query point 310 and respective moving points.

In step 250, the moving points of the corresponding vector values are compared with skyline objects to obtain the vector values of moving points included in the skyline. At this time, it is efficient to perform the comparison with the exclusion of skyline object points not dominating the query point 310 such as $P_1$ and $P_5$.

In step 260, distance values between objects whose moving points are included in the skyline and the query point 310 are calculated.

In step 270, the vector values are arranged in order of small to large calculated distance values, and in step 280, a vector value corresponding to the minimum distance value is selected as the minimum vector value. At this time, a plurality of vector values may be selected as the minimum vector value.

In an exemplary embodiment of the present invention, the distance values between the query point 310 and the moving points are calculated using Manhattan distance measurement.

$$MD(p_a, p_b) = \sum_{i=1}^{n} |x_i - y_i| \qquad \text{[Equation 1]}$$

(where $x_1, x_2, \ldots, x_n$ are coordinate values $p_a$, and $y_1, y_2, \ldots, y_n$ are coordinate values $p_b$)

When the moving point 350 is $p_a(x_1, x_2, \ldots, x_n)$, and the query point 310 is $p_b(y_1, y_2, \ldots, y_n)$, the Manhattan distance between the moving point 350 and the query point 310 can be calculated by Equation 1.

For example, when there are five existing skyline object points $P_1$ to $P_5$ as shown in FIGS. 3 and 4, Manhattan distances from the query point 310 to moving points to which the query point 310 is moved on the existing skyline and moving points $V_1$ to $V_7$ forming a new skyline are calculated as shown in FIG. 5.

The vector of a moving point corresponding to the minimum Manhattan distance calculated as described above is selected as the minimum vector value. For example, Manhattan distance values between a query point and respective moving points are calculated as shown in FIG. 5, and the moving points are arranged according to the calculated Manhattan distance values. Since the Manhattan distance values of the moving points $V_1$ and $V_2$ are 5, which is the minimum, the vector values (−5, 0) and (−4, 1) of the moving points $V_1$ and $V_2$ become the minimum vector value.

Also, in another exemplary embodiment of the present invention, a skip region 600 can be set to efficiently select the minimum vector value as shown in FIG. 6.

In other words, in step 230 of FIG. 2, a query point 610 is moved to a region excluding the skip region 600 between the query point 610 and a point at a coordinate pair (4, 6) corresponding to the maximums of the respective coordinate values of skyline objects dominating the query point 610.

To be specific, to calculate a vector value using moving points 650 and the query point 610, the query point 610 is moved along first to seventh moving vectors in whose direction a coordinate value (attribute value) of the query point 610 decreases in order of the first to seventh moving vectors. At this time, when the query point 610 is a long way from skyline object points 620, a region between the moving points 650 and the query point 610 is large, and calculation for an unnecessary region is required. As a result, performance deteriorates. Thus, in the other exemplary embodiment of the present invention, the maximum coordinate values of the skyline object points 620 on the respective coordinate axes (dimensions) are selected, and a region present between the selected maximum coordinate values and the query point 610 is selected as the skip region 600.

For example, as shown in FIG. 6, the skyline object points 620 dominating the query point 610 are $P_2$, $P_3$ and $P_4$, the maximum coordinate value of the dominating skyline object points 620 on an axis $a_1$ (dimension) is 4, the maximum coordinate value on an axis $a_2$ (dimension) is 6, the coordinate pair of the query point 610 is (7, 8), and thus the skip region 600 is present between a coordinate pair (4, 6) and a coordinate pair (7, 8). When vector values and distance values between the moving points 650 and the query point 610 are calculated, it is efficient to perform the calculation with the exclusion of skyline points $P_1$ and $P_5$ not dominating the query point 610.

For this reason, an apparatus for obtaining a minimum cost vector moves the query point 610 from the boundary of the skip region 600 along the first to seventh moving vectors in sequence.

As described above, when a moving point is determined to be included in a skyline, a vector value corresponding to the minimum distance value between the moving point and a query point is selected as the minimum vector value in an exemplary embodiment of the present invention. However, in another exemplary embodiment of the present invention, vector values corresponding to the minimum distance value between a moving point and a query point may be found first, and then a vector value whose moving point is included in a skyline among the vector values may be selected as the minimum vector value.

Figure 7:
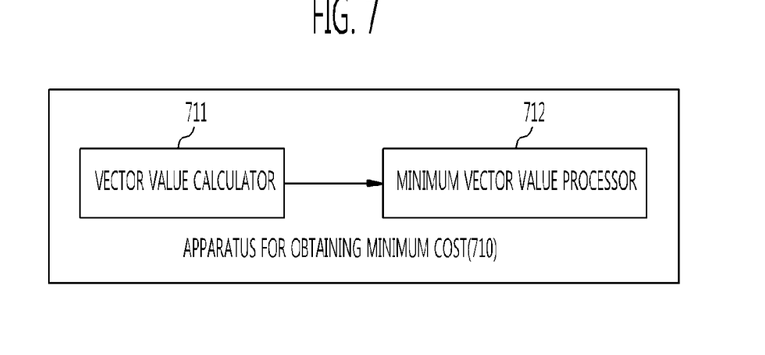
FIG. 7 is a block diagram of an apparatus for obtaining a minimum cost vector according to an exemplary embodiment of the present invention.

FIG. 7 is a block diagram of an apparatus for obtaining a minimum cost vector according to an exemplary embodiment of the present invention.

An apparatus for obtaining a minimum cost vector according to an exemplary embodiment of the present invention can be implemented in a computer having at least one processor and a memory.

As shown in FIG. 7, the apparatus for obtaining a minimum cost vector according to an exemplary embodiment of the present invention includes a vector value calculator 711 and a minimum vector value processor 712.

The vector value calculator 711 receives coordinates of objects constituting a skyline and coordinates of a query point, and reconstructs the skyline using objects dominating the query point among the skyline objects.

The vector value calculator 711 calculates respective vector values having the query point and respective moving points to which the query point is moved as both end points in a multi-dimensional space having a plurality of coordinate axes.

At this time, with the exclusion of a region between the query point and a point corresponding to the maximums of respective coordinate values of the objects constituting the skyline, the vector value calculator 711 may calculate the respective vector values having the query point and respective moving points corresponding to smaller coordinate values than the query point to which the query point is moved on the excluded region as both end points.

The minimum vector value processor 712 selects a vector value whose moving point is included in the skyline and has the minimum distance value from the query point as the minimum vector value.

At this time, the minimum vector value processor 712 calculates the distances between the moving points and the query point using Manhattan distance measurement. Thus, the minimum vector value processor 712 selects a vector value whose moving point has the minimum Manhattan distance value from the query point among the vector values to be arranged as the minimum vector value.

Figure 8:
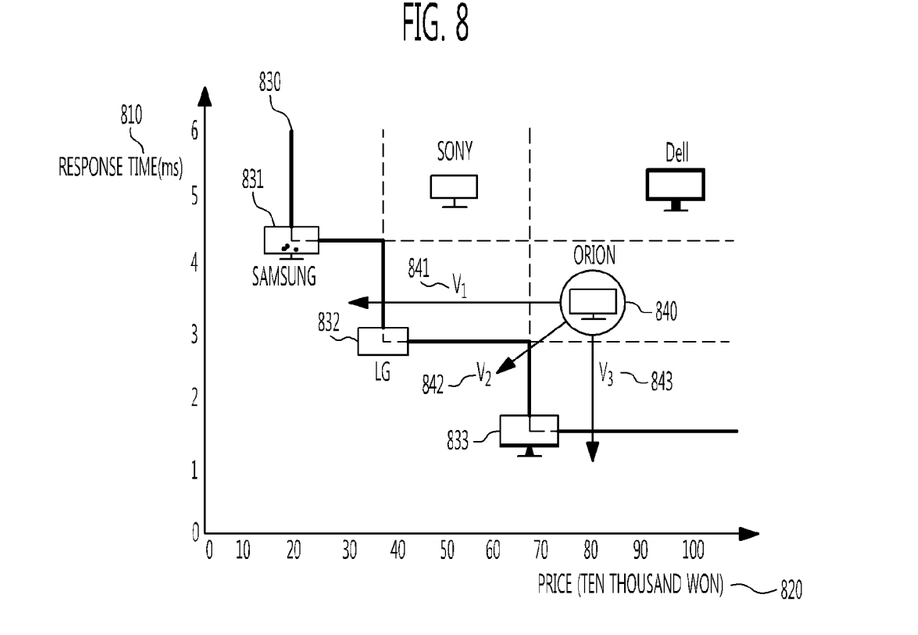
FIG. 8 is a diagram illustrating a method for obtaining a minimum cost vector for making a liquid crystal display (LCD) monitor to be a skyline object according to an exemplary embodiment of the present invention.

FIG. 8 is a diagram illustrating a method for obtaining a minimum cost vector for making a liquid crystal display (LCD) monitor to be a skyline object according to an exemplary embodiment of the present invention.

As shown in FIG. 8, attribute (coordinate) values of an LCD monitor can be a response time 810 and a price of the monitor, and a skyline 830 can be constituted of an LCD monitor 831 from Samsung, an LCD monitor 832 from LG, and an LCD monitor 833 from Sambo.

To increase attraction of its own LCD monitor 840, Orion should find a vector indicating how to change the response time 810 and the price 820 of the LCD monitor 840 to be included in the skyline 830.

The vector for the LCD monitor 840 from Orion to newly constitute the skyline 830 together with the LCD monitors 831, 832 and 833 of the other companies may include various vectors such as a first vector 841, a second vector 842 and a third vector 843.

Thus, in an exemplary embodiment of the present invention, the minimum vector corresponding to the minimum distance value from the LCD monitor 840 is selected from among the first vector 841, the second vector 842 and the third vector 843, so that the LCD monitor 840 from Orion can be included in the new skyline 830 at the minimum cost.

As described above, an exemplary embodiment of the present invention provides a method for effectively including an object in a skyline, that is, a query processing method useful for decision making in various application fields such as service of companies.

The above-described exemplary embodiments of the present invention may be implemented in various ways. For example, the exemplary embodiments may be implemented using hardware, software, or a combination thereof. The exemplary embodiments may be coded as software executable on one or more processors that employ any one of a variety of operating systems or platforms. Additionally, such software may be written using any of a number of suitable programming languages, and also may be compiled as executable machine language code or intermediate code that is executed on a framework or virtual machine.

Also, the present invention may be embodied as a computer readable medium (e.g., a computer memory, one or more floppy discs, compact discs, optical discs, magnetic tapes, flash memories) storing one or more programs that perform methods for implementing the various embodiments of the present invention discussed above when executed on one or more computers or other processors.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of obtaining a minimum cost vector for making a skyline object in a multi-dimensional space, comprising:
    calculating, by a processor, respective vector values having a query point and respective moving points to which the query point is moved as both end points in a multi-dimensional space having a plurality of coordinate axes; and
    selecting a vector value whose moving point is included in a skyline and has a minimum distance value from the query point as a minimum vector value from among the vector values,
    wherein calculating the respective vector values includes moving the query point in a region excluding a region between the query point and a point corresponding to maximums of respective coordinate values of objects constituting the skyline.

2. The method of claim 1, wherein calculating the respective vector values includes calculating respective vector values having the query point and respective moving points corresponding to smaller coordinate values than the query point to which the query point is moved as both end points.

3. The method of claim 2, wherein calculating the respective vector values further includes moving the query point in a direction in which a value of a first coordinate of the query point decreases, subtracting one from a value of a second coordinate of the query point when the query point is moved to a point included in the skyline, and moving the query point again in the direction in which the value of the first coordinate decreases.

4. The method of claim 1, wherein selecting the vector value whose moving point has a minimum distance value from the query point as a minimum vector value includes selecting a vector value whose moving point has a minimum Manhattan distance value from the query point as the minimum vector value from among the vector values.

5. The method of claim 1, wherein selecting the vector value whose moving point has a minimum distance value from the query point as a minimum vector value includes:
    determining whether the moving points are included in the skyline; and
    when it is determined that the moving points are included in the skyline, selecting a vector value whose moving point has a minimum distance value from the query point as the minimum vector value.

6. The method of claim 1, wherein selecting the vector value whose moving point has a minimum distance value from the query point as a minimum vector value includes:
    finding vector values whose moving points have the minimum distance value from the query point; and
    selecting a vector value whose moving point is included in the skyline as the minimum vector value from among the vector values.

7. The method of claim 1, further comprising, before calculating respective vector values:
    receiving coordinates of objects constituting the skyline and the query point; and
    reconstructing the skyline using objects dominating the query point among the objects constituting the skyline.

8. An apparatus for obtaining a minimum cost vector for making a skyline object in a multi-dimensional space, comprising:
    a vector value calculator for calculating respective vector values having a query point and respective moving points to which the query point is moved as both end points in a multi-dimensional space having a plurality of coordinate axes; and
    a minimum vector value processor for selecting a vector value whose moving point is included in a skyline and has a minimum distance value from the query point as a minimum vector value from among the vector values,
    wherein the vector value calculator calculates respective vector values haying the query point and respective moving points corresponding to smaller coordinate values than the query point to which the query point is moved as both end points in a region excluding a region between the query point and a point corresponding to maximums of respective coordinate values of objects constituting the skyline.

9. The apparatus of claim 8, wherein the minimum vector value processor calculates Manhattan distances between the moving points and the query point, arranges the vector values according to the calculated Manhattan distances, and selects a vector value whose moving point has a minimum Manhattan distance from the query point as the minimum vector value from among the arranged vector values.

* * * * *